United States Patent
Ranney et al.

(10) Patent No.: US 12,196,880 B2
(45) Date of Patent: Jan. 14, 2025

(54) METHOD AND APPARATUS FOR DETECTING AND CHARACTERIZING PULSE SEQUENCES

(71) Applicant: U.S. Army Combat Capabilities Development Command, Army Research Laboratory, Adelphi, MD (US)

(72) Inventors: Kenneth I. Ranney, Rockville, MD (US); William J. Diehl, Annandale, VA (US); Kwok Foo Tom, Washington, DC (US); Dannielle Tadas, Germantown, MD (US); Neal Tesny, Ellicott City, MD (US); Andre C. Magill, Fairfax, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 294 days.

(21) Appl. No.: 17/714,177

(22) Filed: Apr. 6, 2022

(65) Prior Publication Data
US 2022/0404458 A1    Dec. 22, 2022

Related U.S. Application Data

(60) Provisional application No. 63/180,678, filed on Apr. 28, 2021.

(51) Int. Cl.
*G01S 7/285* (2006.01)

(52) U.S. Cl.
CPC .................................. *G01S 7/285* (2013.01)

(58) Field of Classification Search
CPC ....................................................... G01S 7/285
See application file for complete search history.

(56) References Cited

U.S. PATENT DOCUMENTS

| | | | |
|---|---|---|---|
| 7,340,381 B2* | 3/2008 | Soma ........................ | H04L 1/24 |
| | | | 702/189 |
| 7,916,814 B2* | 3/2011 | Jones ...................... | G01S 7/021 |
| | | | 375/340 |
| 2016/0020792 A1* | 1/2016 | Wilson .................... | H04L 5/006 |
| | | | 375/227 |

* cited by examiner

*Primary Examiner* — Peter M Bythrow
*Assistant Examiner* — Nazra Nur Waheed
(74) *Attorney, Agent, or Firm* — Alan I. Kalb

(57) ABSTRACT

Method and apparatus for detecting and characterizing a pulse sequence using a finite impulse filter to determine a pulse width (PW) of pulses within the pulse sequence. The method and apparatus may also apply a histogram to the filtered pulses to determine the pulse rate interval (PRI) of pulses in the pulse sequence.

5 Claims, 8 Drawing Sheets

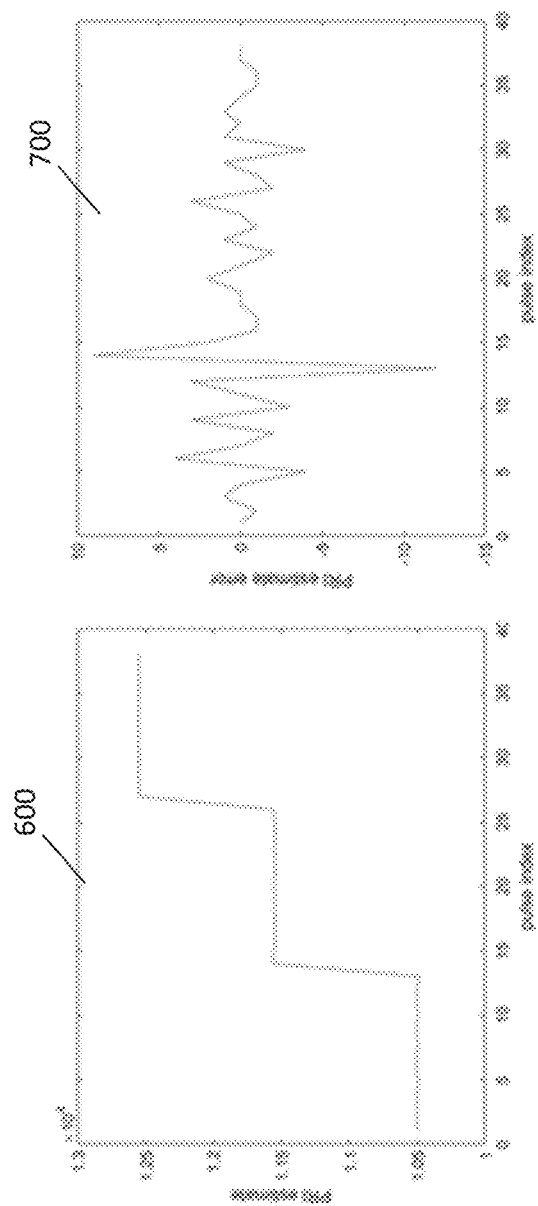
FIG. 6
FIG. 7
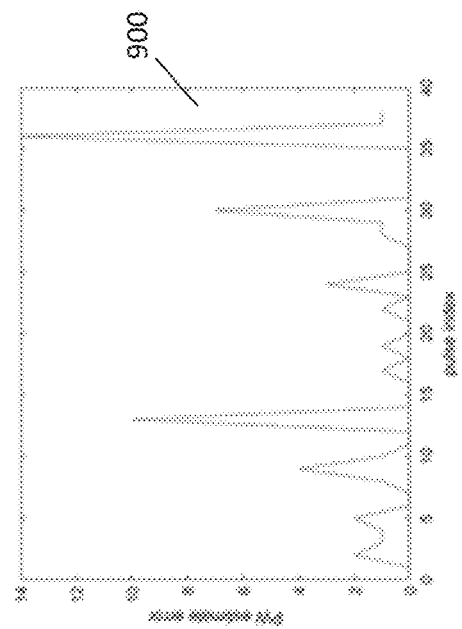
FIG. 9

METHOD AND APPARATUS FOR DETECTING AND CHARACTERIZING PULSE SEQUENCES

RELATED APPLICATION

This application claims benefit to U.S. Provisional Patent Application Ser. No. 63/180,678 filed 28 Apr. 2021 entitled "System For The Rapid Detection And Characterization Of Pulse Sequences," which is hereby incorporated herein by reference in its entirety.

GOVERNMENT INTEREST

The invention described herein may be manufactured, used and licensed by or for the U.S. Government.

BACKGROUND

Field

Embodiments of the present invention generally relate to signal detection techniques and, more specifically, to a method and apparatus for detecting and characterizing pulse sequences.

Description of the Related Art

Signal detection techniques are used in a wide variety of military and civilian applications, for example, to characterize enemy radar, characterize illegal transmitters, airwave monitoring and the like. Various techniques may be used to detect and characterize electromagnetic signals. Recent research has produced a variety of techniques to separate measured pulses into subsets—each transmitted by a different radar system. This subset-creator often includes a pulse width (PW) estimator, a pulse repetition interval (PRI) estimator, and a pulse deinterleaver. While many effective component systems have been proposed, they often sacrifice operational speed in an effort to maximize performance. For example, one approach, based on a Haar wavelet feature, performs frequency domain processing and transforms the signal back to the time domain. This procedure more precisely isolates the signal's frequency domain content prior to pulse detection filtering, but it also introduces additional latencies (processing delays) in the output data sequence.

In another approach, an extremely effective sequential difference (SDIF) deinterleaving algorithm, and its variants, is used to process a block of received signal data and make multiple passes through the block while constructing the SDIF histogram. By making multiple passes through the data set, this algorithm also introduces significant processing delays.

Therefore, there is a need in the art for improved pulse sequence detection and characterization techniques.

SUMMARY

Embodiments of the present invention generally comprise a method and apparatus for detecting and characterizing a pulse sequence using a finite impulse filter to determine a pulse width (PW) of pulses within the pulse sequence. The method and apparatus may also apply a histogram to the filtered pulses to determine the pulse rate interval (PRI) of pulses in the pulse sequence.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 6 depicts a plot of PRI estimates for the pulse stream of FIG. 6;

FIG. 7 depicts the PRI estimate errors due to jitter for the pulse stream of FIG. 6;

FIG. 9 depicts a plot the errors produced by the pulse width estimator for the pulse stream of FIG. 6.

DETAILED DESCRIPTION

In the following description the terms "negative edge" and "trailing edge" are synonymous, as are the terms "positive edge" and "leading edge".

Embodiments of the present invention comprise a signal receiver for receiving signal transmissions containing pulse sequences. The receiver comprises a front end for filtering, down converting and digitizing received transmissions and a signal processor for processing quadrature amplitude signals to determine signal pulse width (PW) and pulse repetition interval (PRI).

Figure 1:
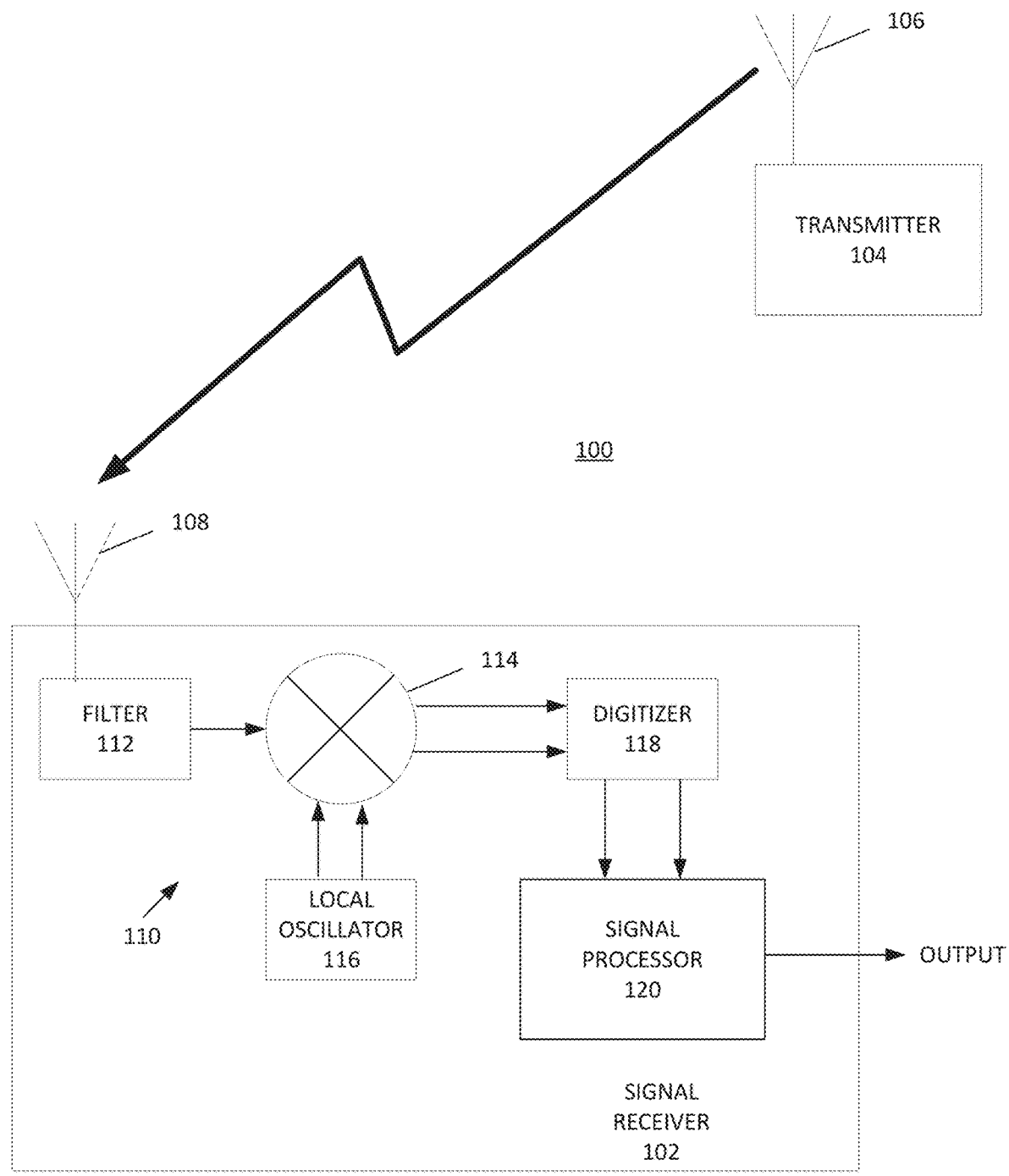
FIG. 1 depicts a high-level block diagram of a use case for a signal receiver in accordance with at least one embodiment of the invention.

FIG. 1 depicts a high-level block diagram of a use case 100 for a receiver 102 in accordance with at least one embodiment of the invention. The use case 100 comprises a transmitter 104 having unknown signal characteristics. The transmitter 104 transmits pulse sequences from an antenna 106. The transmitter 104 may be a radar transmitter, communication signal transmitter, or some other form of transmitter that transmits pulses of electromagnetic radio frequency (RF) signals.

The receiver 102 receives the transmitted signals via its antenna 108. The received signals are coupled to a receiver front end 110. The front end 110 comprises a filter 112, a mixer 114, a local oscillator 116 and a digitizer (analog-to-digital converter (ADC)) 118. The filter 112 reduces the amount of noise entering the receiver and generally selects the frequency bandwidth of interest, i.e., the frequencies of the transmitted signals to be processed by the receiver 102. The local oscillator116 and mixer 114 form a down converter to lower the center frequency to near or at baseband to enable to digitizer to digitize the downconverted signal. The local oscillator 116 provides a quadrature local oscillator signal (e.g., two signals 90 degrees out of phase) such that the output of the mixer is a quadrature signal (I and Q). The I and Q signals are digitized into a digital stream representing the magnitude of each of the I and Q signals. The front end 110 is coupled to a signal processor 120 that detects and outputs the PW and PRI of the received signal.

Figure 2:
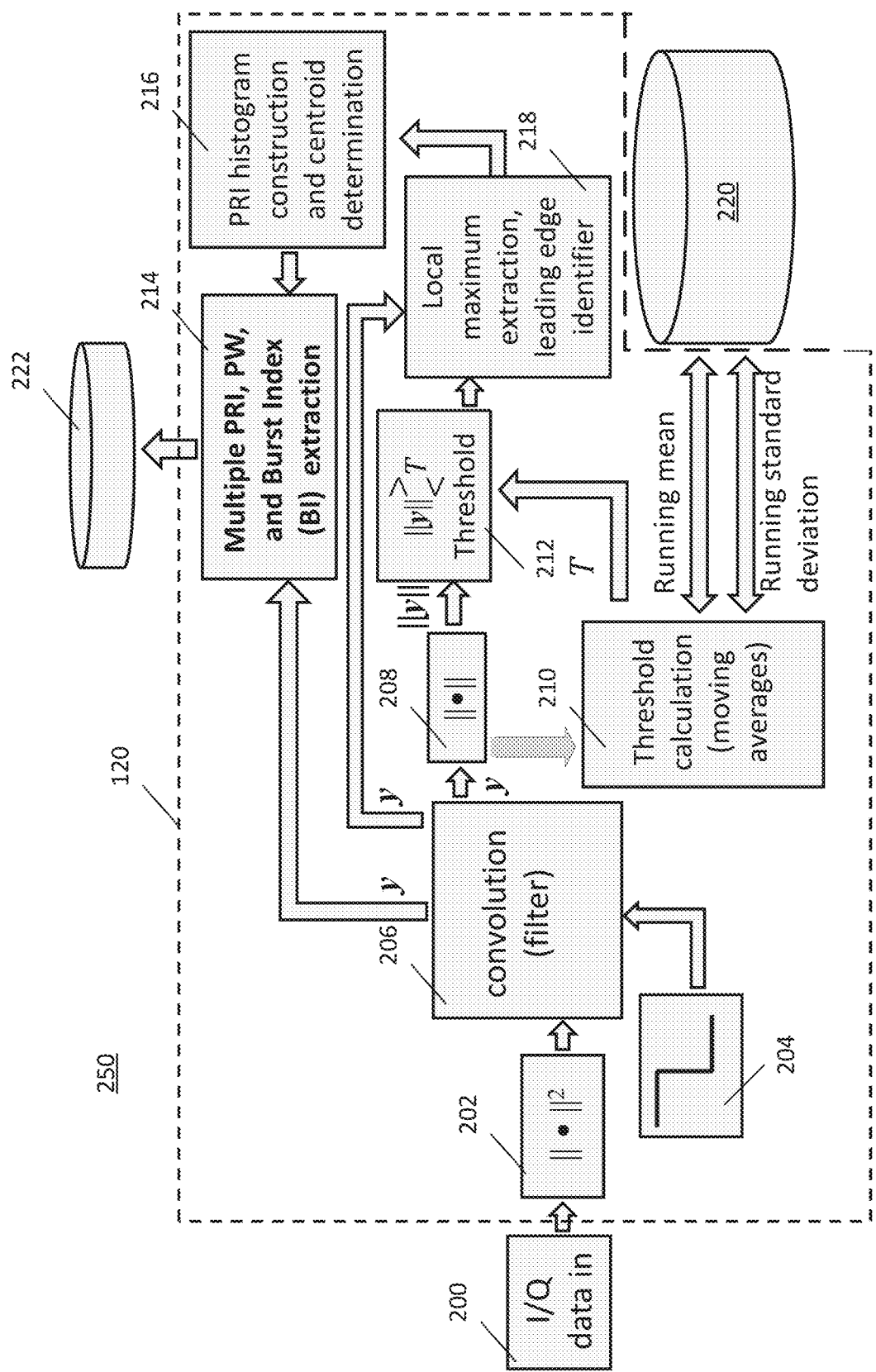
FIG. 2 depicts a detailed functional block diagram of the signal processor of FIG. 1 in accordance with at least one embodiment of the present invention.

FIG. 2 depicts a detailed functional block diagram of the signal processor 120 of FIG. 1 in accordance with at least one embodiment of the present invention. The signal processor 120 and its associated memory 220 and 222 for a rapid pulse detection and characterization (RAPDAC) system 250. In one embodiment, the functionality of the system 250 may be implemented using a computing device described with respect to FIG. 10.

The in-phase and quadrature (I/Q) input data stream 200 is assumed to consist of digital samples from a downconverted operational band. Hence, the size of the surveilled operational band is limited by the sample rate of a coherent analog-to-digital converter (ADC) (e.g. digitizer 118 in FIG. 1). In one embodiment, the size of the surveilled band would be small to reduce the probability of detecting pulses from multiple transmitters (e.g., multiple radar systems).

The RAPDAC system 250 operates on the complex magnitude as represented by block 202. Note that, in other embodiments, the system 250 could operate on a sampled output of an envelope detector instead of the calculated magnitude. The digital, magnitude data from block 204 is coupled to a finite impulse response filter 206, for example, a Haar wavelet filter. Since the convolution operation reverses the signal in time, the equation representing the output of the filter 206 is:

$$y(t) = \sum_{i=0}^{N-1} h(i) \|x(t-i)\|^2, t \geq N-1$$

$$h(i) = \begin{cases} +1, & 0 \leq i < \frac{N}{2} \\ -1, & \frac{N}{2} \leq i < N \end{cases},$$

where N is the filter length.

Thanks to the structure of a Haar filter, the filter 206 has the form:

$$y(t) = \sum_{i=0}^{\frac{N}{2}-1} \|x(t-i)\|^2 - \sum_{i=\frac{N}{2}}^{N-1} \|x(t-i)\|^2 =$$

$$y(t-1) - 2\left\|x\left(t-\frac{N}{2}\right)\right\|^2 + \|x(t-N-2)\|^2,$$

where x(i) is the input complex (in-phase and quadrature) sample sequence. This filter form lends itself to an extremely efficient implementation, without the need for FFTs. When each new sample is obtained, the processor (120 in FIG. 1) performs one multiplication and two additions to obtain the next filter output, for an operation count of O(N) rather than of order O(N log N)—for FFTs—when a block of length N is processed. Since the output peak at a pulse edge occurs at the middle of the Haar wavelet integration window, there is a lag of N/2 samples in the output sequence.

In at least one embodiment of the invention, a threshold estimator 210 comprises the following input components from blocks 202 and 208:

1) A moving average filter of length M that calculates the average of the Haar filter output sequence, $E\{y(t_0)\}$ at block 208.

2) A moving average filter of length M that calculates the average of the square of the Haar filter output sequence, $E\{y^2(t_0)\}$ at block 208.

These quantities may be calculated efficiently with only one addition, one subtraction and two multiplications according to:

$$z(t_0) = \frac{Mz(t_0 - 1) - z(t_0 - N) + z(t_0)}{M},$$

where M is typically much larger than N, and $z(t_0)$ denotes the output of this second moving average filter 208.

These two averages are then used to calculate a threshold at block 210 according to the formula: $T = \mu + k\sigma$, where T is the threshold, $\mu = E\{\|y\|\}$, $\sigma^2 = E\{\|y\|^2\} - \mu^2$, and k is a positive number, typically $\geq 3$. Since the vast majority of the samples include no pulse edges, $\sigma$ is approximated by $\mu$. This arises from the observation that differences of the averaged, independent, identically distributed random variables (i.e., the Haar filter outputs) approach a zero-mean, Gaussian distribution as the number of samples increases, so their magnitudes approach a half-normal distribution, with $$\mu_{half\ normal} = \sigma/\sqrt{2\pi} \text{ and } \sigma_{half\ normal}^2 = \sigma^2(1-2/\pi).$$

Here, $\sigma$ represents the standard deviation of the assumed, zero-mean Gaussian distribution of the Haar filter output. The approximation avoids skewing the estimate of the background standard deviation due to the introduction of extreme outliers near the pulse edges. The running mean and variance are also stored in memory 220 for future manipulation. In other embodiments, a slower-running version of the system 250 may derive the threshold using order statistics.

In one exemplary embodiment, the threshold estimator 210 comprises the incorporation of a "smallest of" constant false alarm rate processor. Here, the mean described in the preceding paragraph is determined for each of the two summations constituting the Haar filter output according to:

$$\mu_1 = \sum_{i=0}^{\frac{N}{2}-1} \|x(t-i)\|^2 \text{ and } \mu_2 = \sum_{i=\frac{N}{2}}^{N-1} \|x(t-i)\|^2,$$

which requires only the data samples from 202. Additional computation involving the output of the filter 206 is not required. The threshold is then defined as $$T = k^* \min(\mu_1, \mu_2),$$

where $\min(\mu_1, \mu_2)$ is the minimum (smallest of) the quantities $\mu_1$, and $\mu_2$, and k is a scaling factor such as $k=10/\sqrt{N}$ for a filter of length N.

This embodiment does not require the use of the filter outputs, y, to calculate the output threshold. The use of filter outputs either (i) introduces additional latency or (ii) restricts attention to only past filter outputs. Recall that a latency of N samples, due to the filter size, has already been introduced.

Once a value of T in block 210 has been specified and applied to $|y(t)|$ within limiter (block 212) such that only samples exceeding the threshold proceed to block 218 (e.g., only thresholded values are further processed). Within block 218, a local-maximum (local-max) filter of length L—referred to herein as a hit editor—eliminates multiple detections due to the same peak in the Haar output sequence. The operation is described by:

$$hitEd(t_0) = \begin{cases} +1, & |y(t_0)| = \max_{t \in [t_0 - \frac{L}{2}, t_0 + \frac{L}{2}]} |y(t)| \\ 0, & \text{otherwise} \end{cases}$$

where hitEd($t_0$) denotes the output of the hit editor (block 218), and L is set to a number such as N/2+1. Positive samples exceeding the threshold represent leading pulse edges, while negative pulses with absolute value exceeding the threshold represent trailing pulse edges. Hence, setting L to N/2+1 retains the peak from the leading edge without dislocating the peak from the trailing edge or introducing false alarms between the edges when the pulse width is equal to N. The positive detections (pulse leading edges) are then extracted for downstream PRI estimation and analysis. Negative detections are associated with preceding positive detections to obtain PW estimates (i.e., the elapsed time between the positive and negative edges indicates the pulse width).

As valid leading-edge (i.e., positive edge) samples emerge from the hit editor (block 218), block 216 (a histogram and centroid processor) compares their leading edge locations with leading edge locations of all pulses within a processing window of length W. In one embodiment, this processing interval is determined by specifying a number of pulses, P, to be processed. Differences between the location of the current pulse and the locations of all previous pulses in W are calculated and used to create a histogram, H. Note that each difference corresponds to a time difference of arrival (TDOA). If, for example, one of the differences equals w, the number of samples falling in bin w of the histogram, H, is incremented by 1. The indices of the component pulses are also saved; thus, a histogram of pulse offsets (TDOAs) is created as well as a record of the pulse locations producing each difference.

As new TDOAs arrive, they are incorporated into the histogram, and are processed in block 216 using a centroid technique based on radar processing concepts. This operation consists of convolving a weighting window of size K+1 (typically rectangular or Hamming), where K/2, an integer, is the expected maximum extent (in bins) of the pulse jitter. Note that the jitter could extend on either side of the centroid location. Centroid locations that satisfy the condition: H($k_i$n±Δ)>0 when H(n)>0 for $k_i$ a positive integer and Δ a pre-defined tolerance are identified as subharmonics of H(n). Δ is referred to as the subharmonic elimination radius. These samples are eliminated from future consideration, and the remaining bins are identified as valid PRIs. After all PRIs are identified, block 214 extracts the set of pulses associated with these PRIs, and their pulse widths are estimated by calculating the difference between the leading and trailing edge locations. The trailing edge is identified as the first negative edge separated from the positive edge of interest by an acceptable number of samples. In at least one embodiment, the number of samples is set equal to N/2. Typically, this negative edge would be the first encountered negative edge following the positive edge; however, if there are multiple negative edges, then an additional criterion is used to select a corresponding positive edge. In a preferred embodiment, the associated positive edge comprises the positive edge most recently encountered prior to each negative edge. If there are consecutive negative edges, then the system 250 requires that the pulse width be less than a certain amount, on the order of the maximum allowed PRI values.

In one embodiment, the method of implementing the centroid calculation comprises incorporation of a rectangular weighting window. This is due to its computational efficiency. In this case, the histogram is readily and efficiently updated through the following steps:

a) identify histogram bins within K/2 of the current PRI candidate value, denoted, n, and let H(n+i) represent the number of histogram counts for those bins, (where $$i \in \left\{ -\frac{K}{2}, -\frac{K}{2}+1, \ldots, \frac{K}{2}-1, \frac{K}{2} \right\}$$

b) Set $$H(n+i) = \frac{(n+i)H(n+i)+1}{(n+i+1)}.$$

c) Let $$n_{max} = \underset{m \in \left\{ n-\frac{K}{2}, n-\frac{K}{2}+1, \ldots, n+\frac{K}{2}-1, n+\frac{K}{2} \right\}}{\operatorname{argmax}} H(m),$$

and set H(m)=0 for m≠$n_{max}$. If there are multiple bins containing the max value, then retain all of them.

d) Examine histogram bins within ±Δ of integer multiples of the identified centroid bin; and set the corresponding histogram values to zero. Δ is the subharmonic elimination radius.

This allows the centroid estimates to be updated "on the fly" (i.e., as pulses arrive), decreasing the associated latency at the expense of a delay associated with convergence of the centroid estimate.

When an input pulse is assigned a PRI histogram bin, its pulse width, arrival time, and current burst index are also recorded with it in memory 222. Within block 214, these parameters are compared with those of the previous pulse assigned to the bin. If the difference in arrival times exceeds the maximum allowed PRI value, then the burst index of the most recent sample is incremented. In this implementation, it is assumed that the observed radar does not change waveforms from pulse to pulse. (That is, the pulse width, and pulse modulation remain the same within a burst.)

Examples of Outputs at Various Stages

Figure 3:
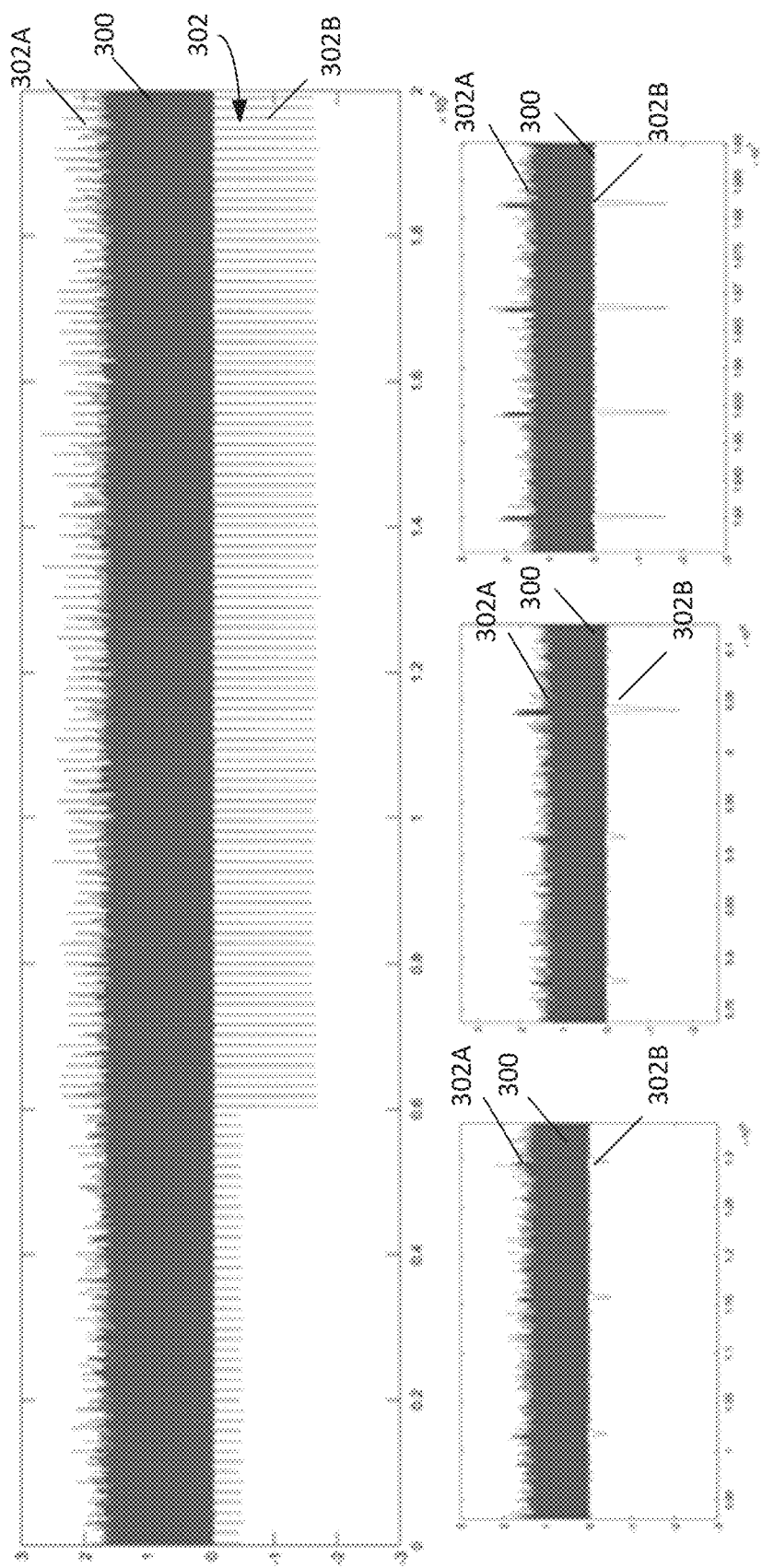
FIG. 3 depicts a plot of an input pulse sequence magnitude for two different signal-to-noise ratios as well as a plot of the finite impulse response filter output.

FIG. 3 depicts an input pulse sequence magnitude 300 for two different signal-to-noise ratios, along with the Haar filter output 302, y(t), for maximized filter parameters. The plot emphasizes how the samples influenced by leading and trailing edges can skew estimates of the background variance, particularly when the SNR is high. The original pulse magnitude sequence is shown at 300, and the positive and negative Haar filter output pulses are shown at 302A (positive) and 302B (negative). The lower plots are zoomed views of different sections of the upper plot.

Figure 4:
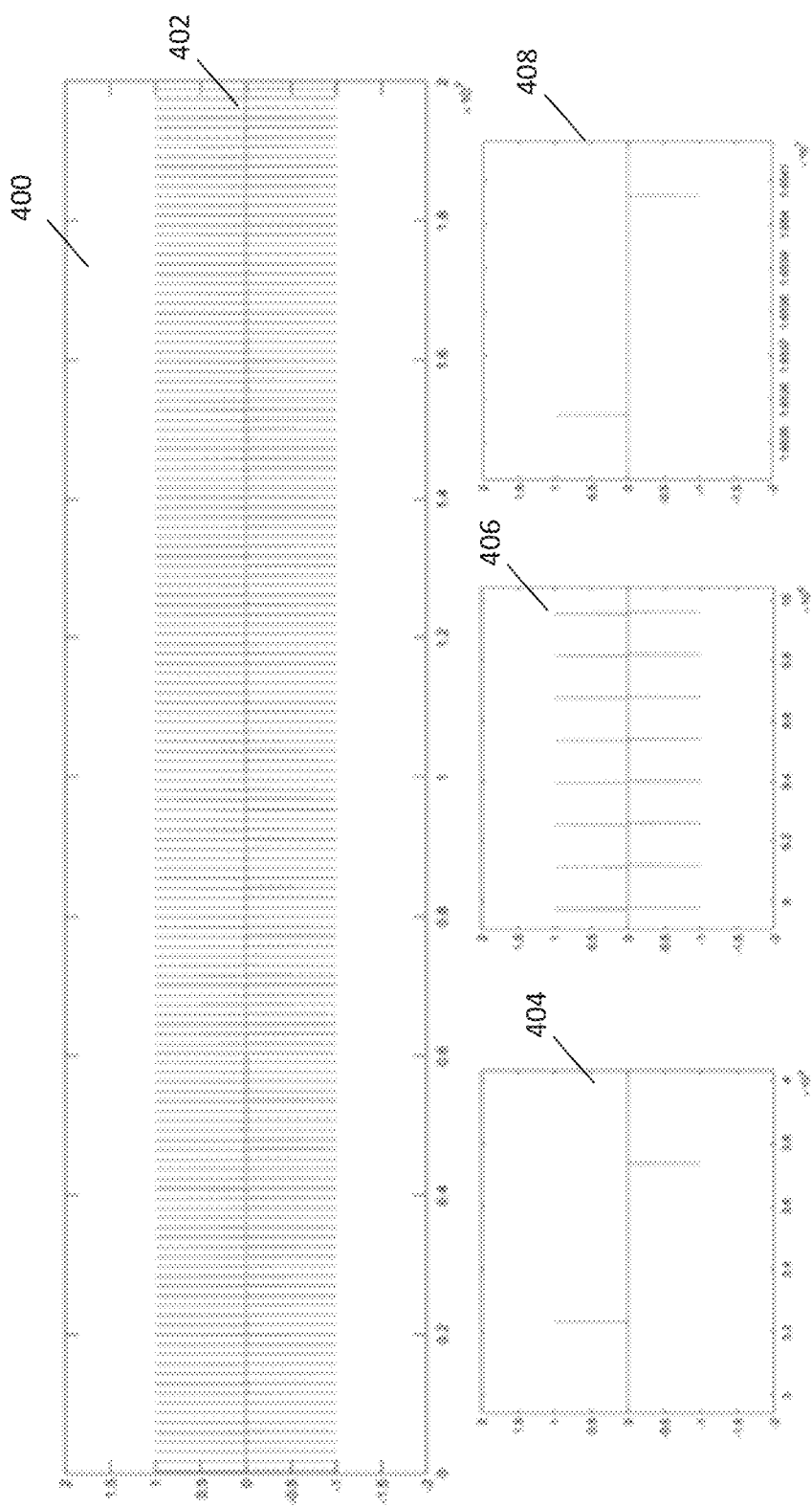
FIG. 4 depicts plots of the output of the threshold and hit-edit operations of FIG. 2.

FIG. 4 depicts plots of the output 402 of the threshold and hit-edit operations (blocks 210, 212, and 218 in FIG. 2). The top plot 400 shows the entire sequence 402 and the bottom plots 404, 406, and 408 depicted close-up versions of various segments of plot 400 including single pulses (left) 404, multiple pulses 406 and another single pulse (right) 408. In this embodiment, a threshold of μ+3σ is used, together with the approximation for σ described above. The input to block 218 from the Haar filter output provides the sign information that is incorporated to indicate leading and trailing edges.

Figure 5:
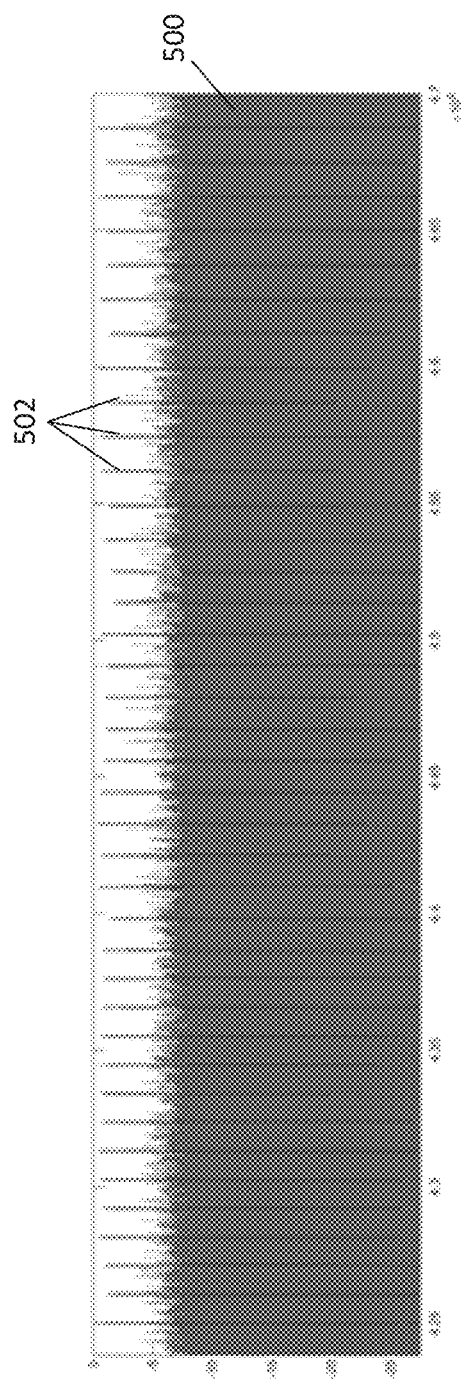
FIG. 5 shows both the input data pulse stream and the estimated edge locations for a pulse burst containing three "stepped" PRIs having 13 pulses per PRI.
Figure 8:
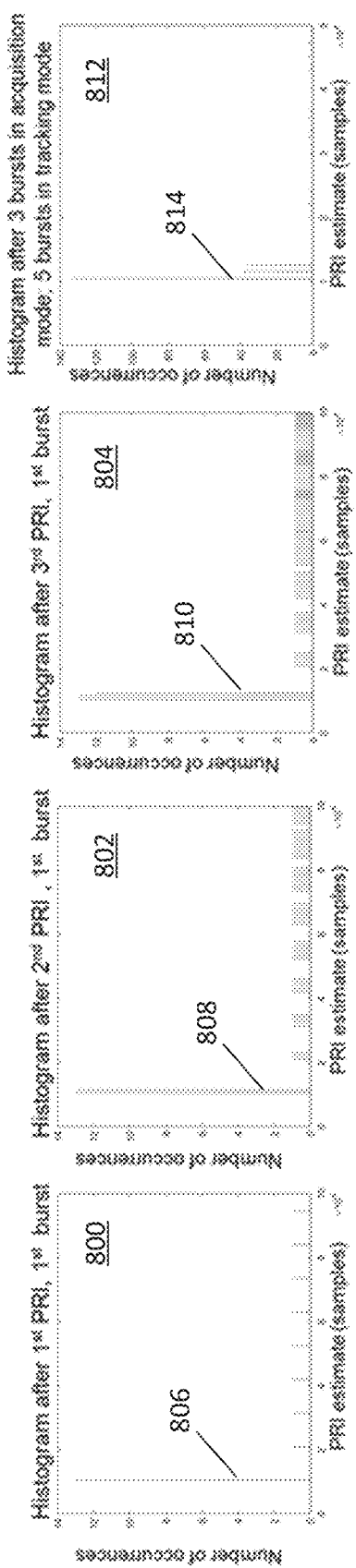
FIG. 8 depicts the PRI histograms produced at the end of each set of input pulses for the pulse stream of FIG. 6.

The data set used for this test included a single PW and a single PRI. To illustrate the behavior of the pulse de-interleaver function, a data set comprising multiple, non-interleaved PRIs with noise injected to create jitter is used. The plot in FIG. 5 shows both the input data pulse stream 500 and the estimated edge locations 502 for a pulse burst containing three "stepped" PRIs having 13 pulses per PRI. FIG. 6 contains a plot of PRI estimates 600 and FIG. 7 illustrates the PRI estimate errors 700. FIG. 8 depicts the PRI histograms 800, 802, and 804 as they appear at the end of each set of pulses (i.e., each PRI value). Here peaks 806, 808, and 810 are evident in the bins corresponding to the three different PRI values, where histogram 800 represents all pulses from first PRI, histogram 802 represents all pulses from second PRI, and histogram 804 all pulses from third PRI. Note that all PRIs are easily identified. The system discards histogram bins containing "residual" values that are below a minimum acceptable level. The residual samples are due to differences not eliminated by the sub-harmonic test. Note that the evolution of the histogram, updated following the arrival of each pulse, makes clear that the sequence comprises 3 different PRIs that are transmitted consecutively. FIG. 812 shows the histogram output in the vicinity of a mode transition. Here, 3 repetitions of the PRI pattern depicted in 806, 808, 810 have occurred, followed by 5 repetitions of a new pattern. The new pattern, indicative of a new operational mode, comprises a larger number of pulses per burst at a single PRI. This single PRI is the same as the initial PRI of the previous pattern. Following 5 bursts in the new mode, we observe that the number of pulses in the bin corresponding to the initial PRI has increased, while the number of pulses in the remaining bins has remained the same. 814 shows the increase in the number of samples at the initial PRI. Note that the number of pulses at all PRIs has increased relative to those from the single burst depicted in 810.

The outputs of blocks 216 and 214, as illustrated in the plots of FIG. 8, constitute a de-interleaver. PRI histograms are constructed for pulses with common pulse widths, segregating them first according to burst and then according to PRI. Block 214 further groups pulses with common PRIs together to identify sequences that are likely to come from the same source (i.e., de-interleave them). It does this sequentially (as each pulse arrives) without waiting to accumulate a block of pulses, creating additional pulse groupings as they arise. The number of past pulses (samples) retained for updating the time differences of arrivals is specified as an integer $N_{saved}$.

FIG. 9 depicts a plot 900 the errors produced by the pulse width estimator. In this exemplary embodiment, the pulse widths remain constant at 401 samples throughout the burst interval (i.e., they do not change when the pulse repetition interval changes). Following the final pulse within the pulse burst considered here, there is a long interval (burst interval) before the beginning of the next burst. This interval is readily identified in both the PRI and the PW estimate sequences.

The results obtained from the measured data illustrates that the system detects and estimates the PW and PRI to within an acceptable error that is a function of the input signal-to-noise ratio (SNR). In addition, the system is capable of detecting and characterizing pulse sequences with a minimal amount of latency, due to efficient implementation of the component processing (i.e., the combined PW and PRI estimators). The system comprises a computationally efficient pulse detector and PW estimator, together with a computationally efficient PRI estimator.

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

Figure 10:
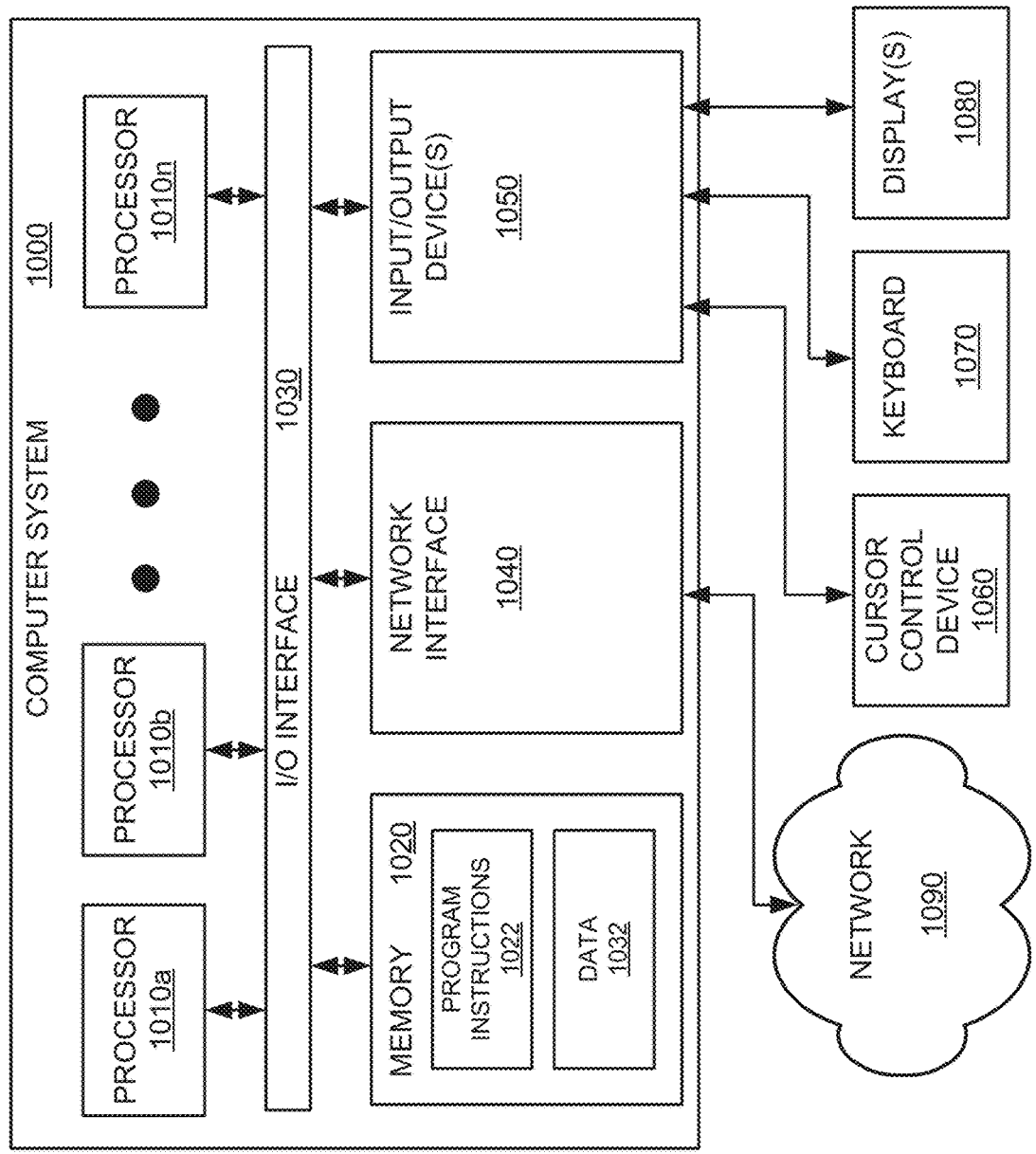
FIG. 10 depicts a high-level block diagram of a computing device suitable for use with embodiments of a system for detecting and characterizing a pulse sequence in accordance with at least one embodiment of the invention.

FIG. 10 depicts a computer system 1000 (a computing device) that can be utilized in various embodiments of the present invention to implement the signal processor 120 of FIG. 1, according to one or more embodiments.

Various embodiments of method and apparatus for detecting and characterizing a pulse sequence, as described herein, may be executed on one or more computer systems, which may interact with various other devices (e.g., RF receiver front end). One such computer system is computer system 1000 illustrated by FIG. 10, which may in various embodiments implement any of the elements or functionality illustrated in FIGS. 1 and 2. In various embodiments, computer system 1000 may be configured to implement methods described above. The computer system 1000 may be used to implement any other system, device, element, functionality or method of the above-described embodiments. In the illustrated embodiments, computer system 1000 may be configured to implement the signal processor 120 and implement the functional blocks of FIG. 2 as processor-executable executable program instructions 1022 (e.g., program instructions executable by processor(s) 1010) in various embodiments.

In the illustrated embodiment, computer system 1000 includes one or more processors 1010a-1010n coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In various embodiments, any of the components may be utilized by the system to receive user input described above. In various embodiments, a user interface may be generated and displayed on display 1080. In some cases, it is contemplated that embodiments may be implemented using a single instance of computer system 1000, while in other embodiments multiple such systems, or multiple nodes making up computer system 1000, may be configured to host different portions or instances of various embodiments. For example, in one embodiment some elements may be implemented via one or more nodes of computer system 1000 that are distinct from those nodes implementing other elements. In another example, multiple nodes may implement computer system 1000 in a distributed manner.

In different embodiments, computer system 1000 may be any of various types of devices, including, but not limited to, a personal computer system, desktop computer, laptop, notebook, tablet or netbook computer, mainframe computer system, handheld computer, workstation, network computer, or a stand-alone chip set.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs). In multiprocessor systems, each of processors 1010 may commonly, but not necessarily, implement the same ISA.

System memory 1020 may be configured to store program instructions 1022 and/or data 1032 accessible by processor 1010. In various embodiments, system memory 1020 may be implemented using any non-transitory computer readable media including any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 1020. In other embodiments, program instructions and/or data may be received, sent or stored upon different types of computer-accessible media or on similar media separate from system memory 1020 or computer system 1000.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network (e.g., network 1090), such as one or more external systems or between nodes of computer system 1000. In various embodiments, network 1090 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1040 may support communication via wired or wireless general data networks, such as any suitable type of Ethernet network, for example; via digital fiber communications networks; via storage area networks such as Fiber Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

In some embodiments, the illustrated computer system may implement any of the operations and methods described above, such as the functions illustrated by the block diagram of FIG. 2. In other embodiments, different elements and data may be included.

Those skilled in the art will appreciate that computer system 1000 is merely illustrative and is not intended to limit the scope of embodiments. In particular, the computer system and devices may include any combination of hardware or software that can perform the indicated functions of various embodiments. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods and functions described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e. within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g. one or more of A, B, and/or C), unless stated otherwise, it is understood to include one or more of each element, including any one or more combinations of any number of the enumerated elements (e.g. A, AB, AC, ABC, ABB, etc.). When "and/or" is used, it should be understood that the elements may be joined in the alternative or conjunctive.

While the foregoing is directed to embodiments of the present invention, other and further embodiments of the invention may be devised without departing from the basic scope thereof, and the scope thereof is determined by the claims that follow.

The invention claimed is:

1. Apparatus for detecting and characterizing pulse sequences comprising:
a finite impulse response (FIR) filter adapted to filter a magnitude of a received pulse sequence, where each pulse in the pulse sequence comprises a leading edge and a trailing edge, and the FIR filter generates a FIR filter output comprising a positive pulse at each leading edge and a negative pulse at each trailing edge and wherein the FIR filter is a Haar wavelet filter;
a threshold estimator adapted to generate a threshold based upon the magnitude of the input pulse sequence;
a limiter adapted to apply the threshold to the FIR filter output and generate a limiter output comprising FIR filter output that exceed the threshold;
a pulse width extractor adapted to analyze the limiter output and determine a pulse width of pulses in the input pulse sequence and
wherein a first input to the threshold estimator is an output of a moving average filter that calculates the average of the FIR filter output and a second input to the threshold estimator is an output of a moving average filter that calculates the average of the square of the FIR filter input pulse sequence.

2. Apparatus for detecting and characterizing pulse sequences comprising:
a finite impulse response (FIR) filter adapted to filter a magnitude of a received pulse sequence, where each pulse in the pulse sequence comprises a leading edge and a trailing edge, and the FIR filter generates a FIR filter output comprising a positive pulse at each leading edge and a negative pulse at each trailing edge and wherein the FIR filter is a Haar wavelet filter;
a threshold estimator adapted to generate a threshold based upon the magnitude of the input pulse sequence;
a limiter adapted to apply the threshold to the FIR filter output and generate a limiter output comprising FIR filter output that exceed the threshold;
a pulse width extractor adapted to analyze the limiter output and determine a pulse width of pulses in the input pulse sequence and
wherein a first input to the threshold estimator is an output of a moving average filter that calculates the average of the FIR filter output and a second input to the threshold estimator is an output of a moving average filter that calculates the average of the square of the FIR filter input pulse sequence,
further comprising a histogram adapted to accumulate time difference of arrival information between limiter outputs to determine pulse repetition intervals for pulses in the input pulse sequence,
wherein the pulse repetition intervals are derived from a determination of a time difference of arrival of pulses in the input pulse sequence, and
wherein the pulse repetition intervals are convolved with a weighting window to calculate a centroid to accommodate jitter in the input pulse sequence.

3. A method for detecting and characterizing a pulse sequence, comprising:
receiving an input pulse sequence having a magnitude;
filtering, using a finite impulse response (FIR) filter, the magnitude of the input pulse sequence, where each pulse in the input pulse sequence comprises a leading edge and a trailing edge and generating a filter output comprising a positive pulse at each leading edge and a negative pulse at each trailing edge;
generating a threshold based upon the magnitude of the input pulse sequence;
applying the threshold to the filter output to generate a thresholded output comprising the filter output that exceeds the threshold; and
analyzing the thresholded output to determine a pulse width of pulses in the input pulse sequence wherein the filtering is performed by a Haar wavelet filter and,
wherein generating a threshold utilizing a first input comprising an output of a moving average filter that calculates the average of the FIR filter output and a second input comprising an output of a moving average filter that calculates the average of the square of the filter output pulse sequence.

4. A method for detecting and characterizing a pulse sequence, comprising:

receiving an input pulse sequence having a magnitude;

filtering, using a finite impulse response (FIR) filter, the magnitude of the input pulse sequence, where each pulse in the input pulse sequence comprises a leading edge and a trailing edge and generating a filter output comprising a positive pulse at each leading edge and a negative pulse at each trailing edge;

generating a threshold based upon the magnitude of the input pulse sequence;

applying the threshold to the filter output to generate a thresholded output comprising the filter output that exceeds the threshold; and analyzing the thresholded output to determine a pulse width of pulses in the input pulse sequence wherein the filtering is performed by a Haar wavelet filter and, wherein generating a threshold utilizing a first input comprising an output of a moving average filter that calculates the average of the FIR filter output and a second input comprising an output of a moving average filter that calculates the average of the square of the filter output pulse sequence further comprising determining a pulse repetition interval from a determination of a time difference of arrival of pulses in the input pulse sequence further comprising accumulating, within a histogram, time-differences-of-arrivals of thresholded, hit-edited filter outputs to determine a pulse repetition interval for pulses in the input pulse sequence, and further comprising determining the pulse repetition interval from a determination of a time difference of arrival of pulses in the input pulse sequence, wherein the thresholded output is convolved with a weighting window to accommodate jitter in the input pulse sequence.

5. Apparatus for detecting and characterizing a pulse sequence, comprising:

a radio frequency receiver front end adapted to receive a pulse sequence and generate a quadrature magnitude of each pulse in the pulse sequence; and one or more processors and one or more non-transient computer readable medium having instructions stored thereon which, when executed by the one or more processors, cause the one or more processors to perform operations comprising:

filtering, using a finite impulse response filter, the quadrature magnitude of the input pulse sequence, where each pulse in the input pulse sequence comprises a leading edge and a trailing edge and generating a filter output comprising a positive pulse at each leading edge and a negative pulse at each trailing edge;

generating a threshold based upon the magnitude of the input pulse sequence;

applying the threshold to the filter output to generate a thresholded output comprising the filter output that exceeds the threshold; and a pulse width extractor adapted to analyze the thresholded output to determine a pulse width of pulses in the input pulse sequence wherein the finite impulse response filtering is performed using a Haar wavelet filter wherein generating a threshold utilizes a first input comprising an output of a moving average filter that calculates the average of the filter output and a second input comprising an output of a moving average filter that calculates the average of the square of the filter output pulse sequence.

* * * * *